United States Patent [19]
Ritter et al.

[11] 4,125,753
[45] Nov. 14, 1978

[54] WELDING MACHINE FOR LATTICE GRATINGS

[75] Inventors: Klaus Ritter, Graz; Gerhard Jahrbacher, Peggau; Gerhard Ritter, Graz, all of Austria

[73] Assignee: EVG Entwicklungs-u. Verwertungs-GmbH., Steiermark, Austria

[21] Appl. No.: 750,866

[22] Filed: Dec. 15, 1976

[30] Foreign Application Priority Data

Dec. 17, 1975 [AT] Austria ................. 9592/75

[51] Int. Cl.² ........................... B23K 11/02
[52] U.S. Cl. ........................... 219/56; 219/87
[58] Field of Search ............ 219/56, 57, 58, 91, 219/87

[56] References Cited

U.S. PATENT DOCUMENTS

| | | | |
|---|---|---|---|
| 1,228,032 | 5/1917 | Lachman | 219/56 |
| 2,300,700 | 11/1942 | Portor | 219/91 X |
| 2,748,238 | 5/1956 | Zaphiropoulos | 219/58 |
| 3,213,710 | 1/1966 | Barnet | 219/91 |
| 3,692,970 | 9/1972 | Gott | 219/56 |
| 3,838,241 | 9/1974 | Weismann | 219/56 |

FOREIGN PATENT DOCUMENTS

| | | | |
|---|---|---|---|
| 17,572 | 6/1961 | Japan | 219/56 |
| 2,172 | 12/1967 | Japan | 219/56 |

*Primary Examiner*—E. A. Goldberg
*Attorney, Agent, or Firm*—Ernest F. Marmorek

[57] ABSTRACT

The invention relates to multi-spot-welding machines for the production of lattice gratings suitable for use for example as walk ways, and which consist of upright flat bars parallel to one another and cross-bars welded transversely into these and again parallel to one another. The flat bars are usually fed intermittently to welding electrodes. The machine of the invention has at least one pair of cooperating electrodes which are aligned in the feed direction of the flat bars and spaced apart a distance substantially equal to the desired spacing of the cross-bars. The or each pair of electrodes is pressed in turn against each pair or cross-bars to be welded and the upright flat bars themselves act as current bridges between the electrodes of the or each pair. An abutment supports the flat bars against the force of the welding electrodes and this abutment has considerably greater hardness and wear resistance than the flat bar material. The abutment is of suitable design and is suitably positioned to correct the deformation of the longitudinal bars which occurs when the transverse members are welded thereon.

5 Claims, 3 Drawing Figures

WELDING MACHINE FOR LATTICE GRATINGS

The invention relates to a multi-spot-welding machine for the production of lattice gratings, (flat bars standing on edge, parallel to one another, carrying cross-bars welded on transversely to these and parallel to one another), wherein the flat bars are fed intermittently to the welding electrodes of the machine.

For the production of welded lattices of intersecting longitudinal and transverse wires, the double-spot-welding process is known, wherein two wire cross-points to be welded are included in series in a common circuit and the two associated electrodes lie on the same side of the lattice production plane. Welded wire lattices, which are used mainly for reinforcement purposes in reinforced concrete construction, are made from cold-drawn wires of high strength. Because cold-drawn wires lose their strength characteristics on severe heating, passive current bridges are disposed parallel to the wires extending in the direction of flow of the welding current in the known multispot-welding machines. These current bridges represent a conducting connection between the welding points of the double-spot-welding section, hitherto connected to opppositely poled electrodes. The bridges have a large cross-sectional area and consist of a material which is a very good conductor, so that the greater part of the welding current flows through the bridges and not through the lattice wire electrically connected in parallel to the bridge. Thus a harmful heating of this wire in the region between the two welding spots is largely avoided. (See for example Austrian Patent Specification No. 259,993.).

The invention is based on recognition of the fact that when using the double-spot-welding process in a multi-spot-welding machine of the kind indicated at the beginning, for the production of lattic gratings additional current bridges of a material which is a good conductor, which would be exposed to severe wear during the advance of the flat bars and during the welding thereof to the cross bars, can be avoided by a suitable machine construction, that is, by a construction according to the invention in which the machine includes at least one pair of cooperating electrodes aligned in the feed direction of the flat bars and spaced apart a distance substantially equal to the desired spacing on the cross-bars, the or each pair of electrodes being pressed in turn against each pair of cross-bars to be welded on and the upright flat bars themselves being used as current bridges between the electrodes of the or each pair; and an abutment supporting the flat bars against the force of the welding electrodes, the abutment having a considerably greater hardness and wear resistance than the flat bar material.

The invention is thus an improvement in a conventional multi-spot welding machine for the production of metal lattice gratings. Such machines in general comprise means for placing transverse lattice members across parallel upright flat longitudinal bars which are spaced from one another; means for feeding said longitudinal bars (carrying said transverse members) between at least one pair of cooperating electrodes in series with application of deforming pressure by said electrodes upon said longitudinal bars; and abutments adapted to support said longitudinal bars against the pressure exerted by said electrodes during welding. The improvement consists in that the abutments are adapted by configuration and position to cause longitudinal bars in said machine to bend in an opposite direction from the direction in which said bars are bent, when said bars are pressed by said electrodes during welding of the transverse members thereon.

Since no cold-worked and therefore heat-sensitive steel is used in lattice gratings, at last for the flat bars, and since, in addition, the flat bars have relatively large cross-sectional areas, if the double-spot-welding sections are disposed in the feed direction of the flat bars, the flat bars themselves can be used as current bridges between the welding spots without the welding current causes severe or even harmful heating of the flat bars. The relatively high welding pressure, which is necessary in order to weld the cross-bars, in their full thickness, into the narrow sides of the upright flat bars and so ensure satisfactory walking conditions on the surface of the grating (lattice gratings are used mainly as working platforms in engine rooms and the like), is taken up by the wear-resistant abutment on which guides for the upright flat bars may also be formed.

The deep welding-in of the cross bars causes severe distortion of the lattice gratings which are deformed concavely towards the cross-bars because of the high stresses caused by the great welding heat supplied locally and the subsequent cooling down.

This distortion of the lattice grates can be prevented by imposing a compensating counter-curvature on the flat bars during the welding, for which purpose the surface of the abutment may, for example, be curved convexly about an axis extending in the transverse direction of the machine that is, transverse to the feed direction of the machine.

The same effect can also be achieved by the fact that the length of the surface of the abutment supporting the flat bars is shorter than the spacing of the cross bars, measured in the feed direction so that the high portions of each pair of abutments are not directly below the normal pressure points of the pair of electrodes thereover (as is shown in FIG. 1). This shortened construction of the abutment means that the electrode pressures exerted on the cross bars and the reaction forces corresponding to these electrode pressures and exerted by the abutment do not lie on the same lines of action, so that, simultaneously with the welding, a bending moment in their plane is exerted on the flat bars which pre-deforms the flat bars in a direction opposite to the expected distortion resulting from the welding operation. Preferably the midpoint between each pair of abutments is below the midpoint of the pair of electrodes thereover, as is shown in FIG. 1.

The deformation which the lattice grating suffers as a result of the welding in of the cross-bars depends on the height of the flat bars, the spacing between the cross-bars, on their diameter and other factors. It is therefore desirable to construct the machine so that the pre-curvature imparted to the flat bars during the welding operation is variable.

In a preferred form of embodiment of the invention, the abutment is formed, for this purpose, from two symmetrical bearing blocks extending, with spacing, parallel to one another and to the two rows of electrodes, and devices are provided for the simultaneous and opposite displacement of both bearing blocks by equal distances parallel to the feed direction of the flat bars. In other words, means are provided for increasing and decreasing the space between the pairs of abutments.

A machine according to the invention will now be described with reference to the accompanying drawings, in which.

Figure 1:
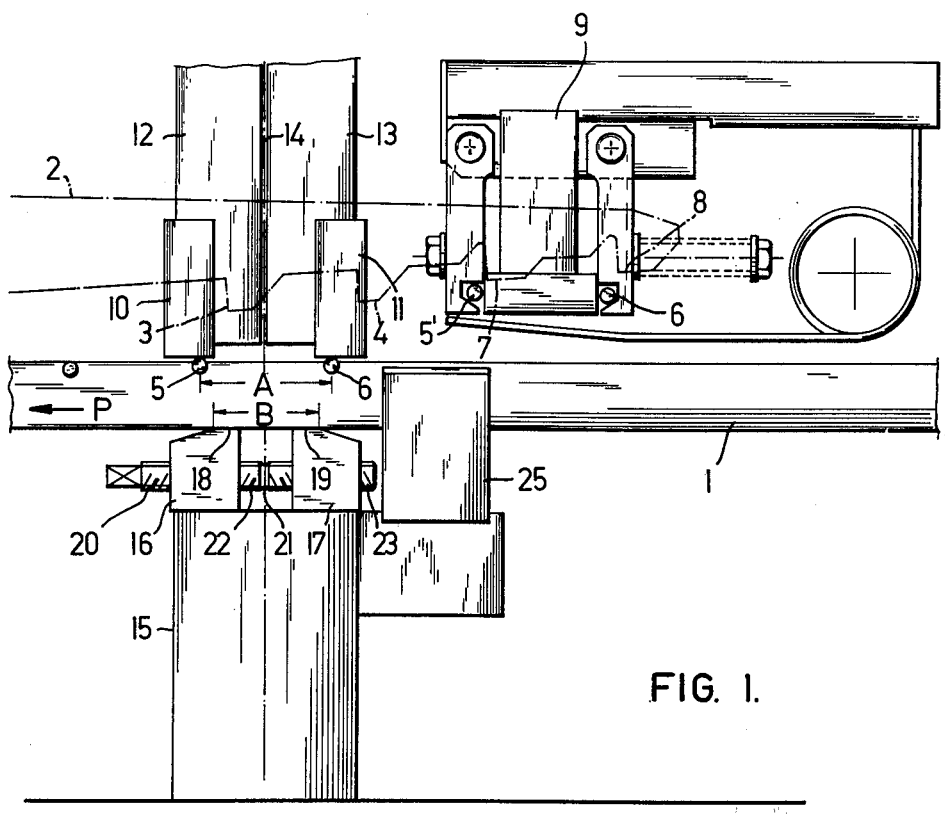
FIG. 1 shows a diagrammatic side view of the welding machine.

Flat bars 1 are conveyed intermittently through the welding machine in the direction of the arrow P, in parallel side by side. The conveying mechanism is known and since it is not a subject of the invention, does not need to be described in more detail here. Its most important parts are special rods 2 which are indicted by a broken line and which grasp the grating with hooks 3, 4 at the last cross-bars 5, 6 to be welded-in and convey them further, in the direction of the arrow P, by a distance which is equal to double the cross-bar spacing "A."

At the same time, hooks 7, 8 at the end of each special rod 2 grasp cross bars 5', 6' freshly supplied in a cross-bar supply device 9, which is likewise only shown diagrammatically, take these from the cross-bar supply 9 and convey them, in one operation with the feed of the grating, between the electrodes 10, 11 of the welding machine. The electrodes 10, 11 are secured to bus bats 12, 13, to which they are electrically connected. The bus bars are electrically separated from one another by an insulating layer 14 and extend across the whole width of the machine. They are connected to the secondary windings of welding transformers (not illustrated).

The bus bars 12, 13 are secured in known manner to a strong beam (not illustrated) which extends over the width of the welding machine and which is adapted for movement upwards and downwards in the working rhythm of the welding machine, so that the electrodes 10, 11 can be lifted from the lattice grate while this is being advanced at each working step, and can then be pressed against the welding material again for a fresh welding operation.

The oppositely poled electrodes 10, 11 are disposed one behind the other in the feed direction of the welding material, with a spacing which corresponds substantially to the spacing "A" of the cross bars. Each flat bar 1 may be provided with its own pair of electrodes 10, 11, but it is also possible to make the electrodes 10, 11 sufficiently long in a direction parallel to the cross-bars so that they bridge a plurality of the flat bars 1.

A supporting abutment 15 is provided on the side of the flat bars 1 opposite the electrodes 10, 11.

In the example illustrated, the abutment 15 consists of two bearing blocks 16, 17 which are symmetrical in the feed direction of the flat bars 1, displaceable by equal distances in opposite directions, and extend across the whole width of the machine. Each of the bearing blocks 16, 17 forms a supporting surface 18, 19 for the flat bars 1.

A spindle 20, which is held non-displaceably at 21 and carries opposite threads 22, 23 at each side of its bearing 21 (only indicated in FIG. 1) passes through the two bearing blocks 16, 17 and enables the bearing blocks 16, 17 to be displaced by equal distances in opposite directions so that the total length "B" of the supporting surface can be altered.

Thus, from the predetermined welding pressure, that is the force with which the electrodes 10, 11 are pressed against the cross-bars 5, 6, and the selective difference in the distance A and B, there results a selective bending moment which predeforms the flat bars 1 in their plane precisely to such an extent that the distortion of the grating occurring after the welding is compensated for.

Since the narrow sides of the flat bars are pressed against the abutment 15 with very great forces during the welding and are advanced, sliding over the abutment, during the feed of the welding grate, the bearing blocks 16, 17 are made of wear-resistant material, such as quenched steel.

A comb 25, between the teeth of which the flat bars 1 are guided, prevents the flat bars from tipping over under the pressure of the welding electrodes.

Figures 2A, 2B:
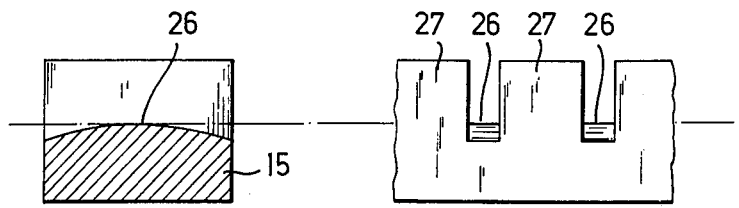
FIGS. 2a and 2b show a cross-section and a partial view of an abutment constructed differently from that shown in FIG. 1.

FIGS. 2a and 2b show, in cross-section and in a partial view, another form of the abutment 15. The surface 26 of this abutment is selected to be convex about an axis extending in the transverse direction of the machine, so that the flat bars 1 undergo a preliminary curvature under the pressure of the electrodes 10, 11 during the welding, which curvature compensates for the distortion caused by the welding and cooling operation. Formed at the surface of the abutment 15 of FIGS. 2a and 2b are tooth-like projections 27 which together form a guide comb for the flat bars 1 and can reinforce or replace the guide comb 25 shown in FIG. 1.

We claim:

1. In a multispot welding machine for producing lattice gratings from transversely spaced longitudinal bars and from transverse members, each of which extend across the longitudinal bars and contacts a respective one of the longutudinal bars at a respective crossing location, the machine being of the type including a support on which the longitudinal bars rest and at least two welding electrodes, each of which contacts and presses against one of the transverse members at a different one of the crossing locations of the respective longitudinal bar during the welding operation of the machine, the improvement comprising means for imparting to the respective longitudinal bar during the welding operation a deformation which is substantially of the same magnitude as, and of the opposite sense than the deformation which the respective longitudinal bar suffers while cooling subsequent to the welding operation, including at least one abutment surface of the support which engages the respective longitudinal bar, intermediate the two different crossing locations, and about which the forces exerted by the welding electrodes on the respective transverse members deflect the respective longitudinal bar for the duration of the welding operation, while the respective longitudinal bar reassumes its original undistorted configuration upon cooling.

2. A machine according to claim 1, wherein said abutment surface is convex as considered in the longitudinal direction of the respective longitudinal bar resting thereon.

3. A machine according to claim 1, wherein said abutment surface is convex and has an apex which is offset longitudinally of the respective longitudinal bar from the two different locations.

4. A machine as defined in claim 1, wherein the support includes two support blocks, each of which has a portion of said abutment surface thereon, said support blocks being spaced apart in the longitudinal direction of the respective longitudinal bar.

5. A machine as defined in claim 4, wherein said support includes a frame, and further comprising means for mounting said support blocks on said frame for displacement toward and away from one another.

* * * * *